United States Patent
Lin

(10) Patent No.: US 11,032,458 B2
(45) Date of Patent: Jun. 8, 2021

(54) MULTI-LENS PROTECTION DEVICE OF MOBILE PHONE

(71) Applicant: Chia-Hao Lin, New Taipei (TW)

(72) Inventor: Chia-Hao Lin, New Taipei (TW)

(*) Notice: Subject to any disclaimer, the term of this patent is extended or adjusted under 35 U.S.C. 154(b) by 0 days.

(21) Appl. No.: 16/726,264

(22) Filed: Dec. 24, 2019

(65) Prior Publication Data

US 2021/0092268 A1  Mar. 25, 2021

(30) Foreign Application Priority Data

Sep. 24, 2019 (TW) .................................. 108212733

(51) Int. Cl.
| | | |
|---|---|---|
| *G03B 11/04* | (2021.01) | |
| *H04N 5/225* | (2006.01) | |
| *G02B 13/00* | (2006.01) | |
| *H04M 1/02* | (2006.01) | |
| *G02B 7/02* | (2021.01) | |

(52) U.S. Cl.
CPC .......... *H04N 5/2257* (2013.01); *G02B 7/021* (2013.01); *G02B 13/0015* (2013.01); *H04M 1/0264* (2013.01); *H04N 5/2254* (2013.01)

(58) Field of Classification Search
USPC ....................................................... 396/529
See application file for complete search history.

(56) References Cited

U.S. PATENT DOCUMENTS

| | | | | |
|---|---|---|---|---|
| 8,764,319 B2* | 7/2014 | Oh | ........................ | G03B 11/041 396/448 |
| 8,953,083 B2* | 2/2015 | Hegde | .................. | H04N 5/2257 348/335 |
| 9,785,299 B2* | 10/2017 | Wickboldt | ............... | G02B 1/14 |
| 2007/0269202 A1* | 11/2007 | Forsyth-Martinez | ........................ | G03B 17/00 396/429 |
| 2019/0243031 A1* | 8/2019 | Burrough | .................. | G02B 1/14 |

* cited by examiner

*Primary Examiner* — Clayton E. LaBalle
*Assistant Examiner* — Warren K Fenwick
(74) *Attorney, Agent, or Firm* — Raymond Chan

(57) ABSTRACT

A multi-lens protection device of a mobile phone includes a protector, a multi-lens positioning plate, a first adhesive layer, an opaque printing layer, and a second adhesive layer. The multi-lens positioning plate has at least two perforations corresponding to camera lenses of the mobile phone. The first adhesive layer is attached to one side of the multi-lens positioning plate, facing the protector. The opaque printing layer is attached to one side of the protector, facing the first adhesive layer and adhered to the first adhesive layer. The second adhesive layer is attached to another side of the multi-lens positioning plate, facing away from the first adhesive layer. The perforations of the multi-lens positioning plate is quickly aligned with the camera lenses, and the protector is accurately adhered to a camera module convex body without generating air bubbles, thereby protecting the camera module convex body from scrapes or direct impacts.

8 Claims, 5 Drawing Sheets

MULTI-LENS PROTECTION DEVICE OF MOBILE PHONE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a multi-lens protection device of a mobile phone, and more particularly to a protector that can be quickly positioned and adhered to multiple camera lenses and can protect a camera module convex body of the mobile phone, thereby reducing the chance of contaminating surrounding dust and preventing air bubbles.

Description of Related Arts

Portable electronic devices, such as mobile phones and tablet computers, etc., usually have a camera module on the back. A traditional camera module only has a single camera lens. With the development and progress of technology, the camera function of portable electronic devices has been improved greatly. However, the thickness of portable electronic devices is becoming thinner and the camera function is more complicated, so camera modules and lenses are mostly disposed on the portable electronic devices in a convex manner. A mobile phone is taken as an example, referring to FIG. 1. A camera module convex body 2 of the mobile phone 1 is provided with a plurality of camera lenses 3 to form a camera lens group 4. The multiple camera lenses 3 are configured to achieve different photography effects such as wide-angle, macro, aperture adjustment, depth of field, etc. The camera module convex body 2 is further provided with a flash 5, a sensor 6, etc. However, even if the mobile phone 1 is provided with a protective cover, the camera module convex body 2 and the camera lenses 3 are often exposed to the outside, which causes the camera module convex body 2 and the camera lenses 3 to be easily scraped and damaged. Therefore, a user usually attaches a protector on each of the camera lenses 3 to protect the appearance of the camera lens group 4 from being damaged, but the camera module convex body 2 is still not protected. Besides, it is usually difficult to attach a protector to a camera lens 3, and it is not easy for the user's fingers to hold the protector that is as small as a lens. When the release film is removed from the underside of the protector, it will attract dust particles around the fingers, and these dust particles will form air bubbles during the attachment process. It is not easy to discharge the air bubbles. In addition, when the user wants to attach the protector, the user's sight may be blocked by his/her fingers. As a result, the protector is not aligned with the camera lenses, which affects both beauty and functionality. The plurality of camera lenses 3 of the camera lens group 4 need to be covered with protectors one by one, which is labor-intensive and time-consuming and extremely troublesome. Accordingly, the inventor of the present invention has devoted himself based on his many years of practical experiences to solve these problems.

SUMMARY OF THE PRESENT INVENTION

In view of the aforesaid shortcomings, the primary object of the present invention is to provide a multi-lens protection device of a mobile phone. A protector is attached to a multi-lens positioning plate, and the multi-lens positioning plate has a plurality of perforations corresponding to camera lenses of a camera module convex body, so that the multi-lens positioning plate can be quickly aligned with and adhered to the protector, and the camera module convex body can be protected from scrapes or direct impacts. The protector can be quickly and accurately attached to the camera module convex body, thereby reducing the chance of contaminating the surrounding dust.

Another object of the present invention is that the protector has a first through hole corresponding to a flash of the mobile phone, and a shielding coating is coated on the periphery of the first through hole, and an opaque printing layer is provided between the protector and the multi-lens positioning plate. This can reduce the light of the flash to pass through the protector to generate a refraction and light guide to lead to white haze or bluish tone in the photo.

In order to achieve the aforesaid object of the present invention, a multi-lens protection device of a mobile phone is provided. The multi-lens protection device comprises a protector, a multi-lens positioning plate, a first adhesive layer, an opaque printing layer, and a second adhesive layer. The protector corresponds in contour and in shape to an upper surface of a camera module convex body on the mobile phone. The multi-lens positioning plate corresponds in contour and in shape to the protector. The multi-lens positioning plate has at least two perforations corresponding in position and in shape to camera lenses on the camera module convex body. The first adhesive layer corresponds in shape to the multi-lens positioning plate and is attached to one side of the multi-lens positioning plate, facing the protector. The opaque printing layer corresponds in shape to the first adhesive layer and is attached to one side of the protector, facing the first adhesive layer. The opaque printing layer is adhered to the first adhesive layer. The second adhesive layer corresponds in shape to the multi-lens positioning plate and is attached to another side of the multi-lens positioning plate, facing away from the first adhesive layer. A total thickness of the second adhesive layer, the multi-lens positioning plate, the first adhesive layer and the opaque printing layer is greater than or equal to a height of the camera lenses protruding from the camera module convex body.

In an embodiment of the present invention, the protector has a first through hole corresponding to a flash on the camera module convex body, and the multi-lens positioning plate has a first plate through hole corresponding to the first through hole.

In an embodiment of the present invention, a shielding coating is coated on a periphery of the first through hole.

In an embodiment of the present invention, the shielding coating is a black ink coating.

In an embodiment of the present invention, the protector has a second through hole corresponding to a sensor on the camera module convex body, and the multi-lens positioning plate has a second plate through hole corresponding to the second through hole.

In an embodiment of the present invention, the multi-lens positioning plate is made of an opaque hard plastic material or an aluminum alloy material.

In an embodiment of the present invention, an explosion-proof layer is provided on an underside of the protector located in each of the perforations. A third adhesive layer is disposed on top of the explosion-proof layer to be adhered to the underside of the protector. The total thickness of the second adhesive layer, the multi-lens positioning plate, the first adhesive layer and the opaque printing layer minus a total thickness of the explosion-proof layer and the third adhesive layer is greater than or equal to the height of the camera lenses 3 protruding from the camera module convex body.

In an embodiment of the present invention, the opaque printing layer is a black ink coating.

With the above device, the perforations of the multi-lens positioning plate can be quickly aligned with the respective camera lenses, and the protector can be quickly and accurately adhered to the camera module convex body without generating air bubbles, thereby protecting the camera module convex body from scrapes or direct impacts.

DETAILED DESCRIPTION OF THE PREFERRED EMBODIMENT

Embodiments of the present invention will now be described, by way of example only, with reference to the accompanying drawings.

Figure 1:
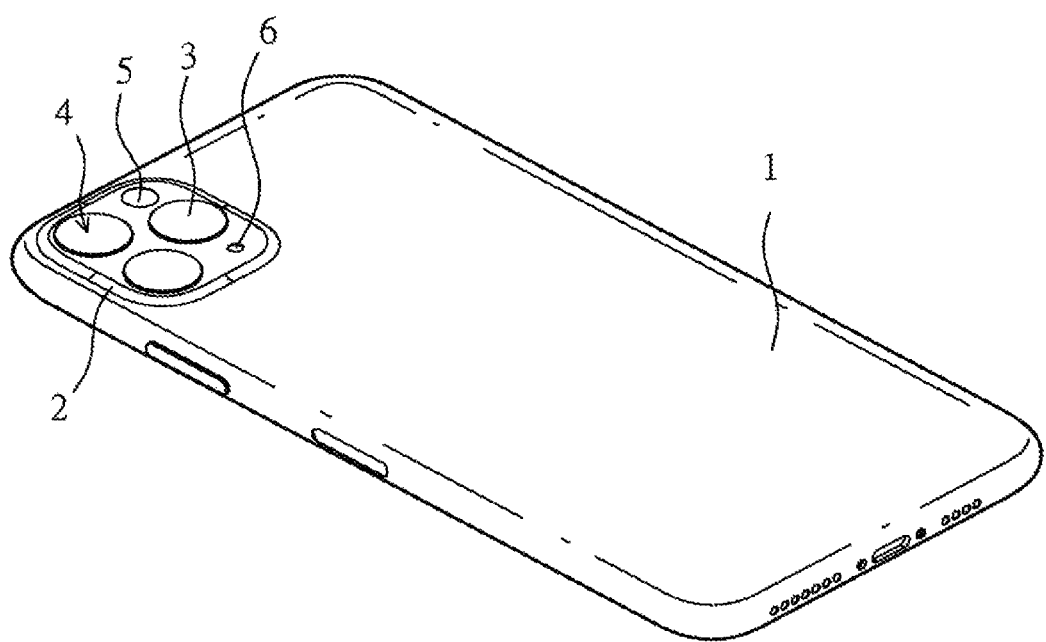
FIG. 1 is a perspective view showing the camera lens group of a mobile phone.
Figure 2:
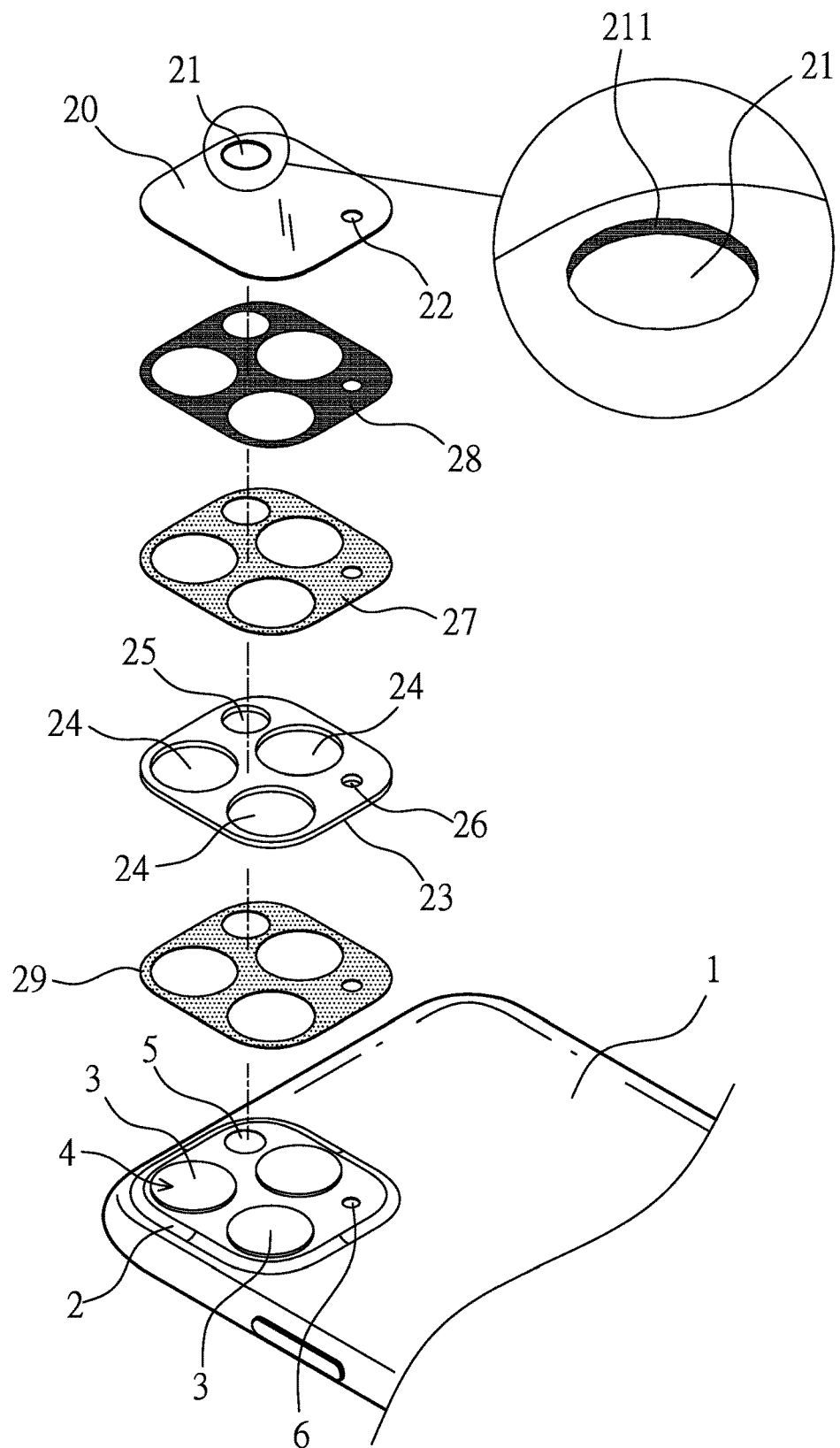
FIG. 2 is an exploded view of the present invention attached to the mobile phone.
Figure 3:
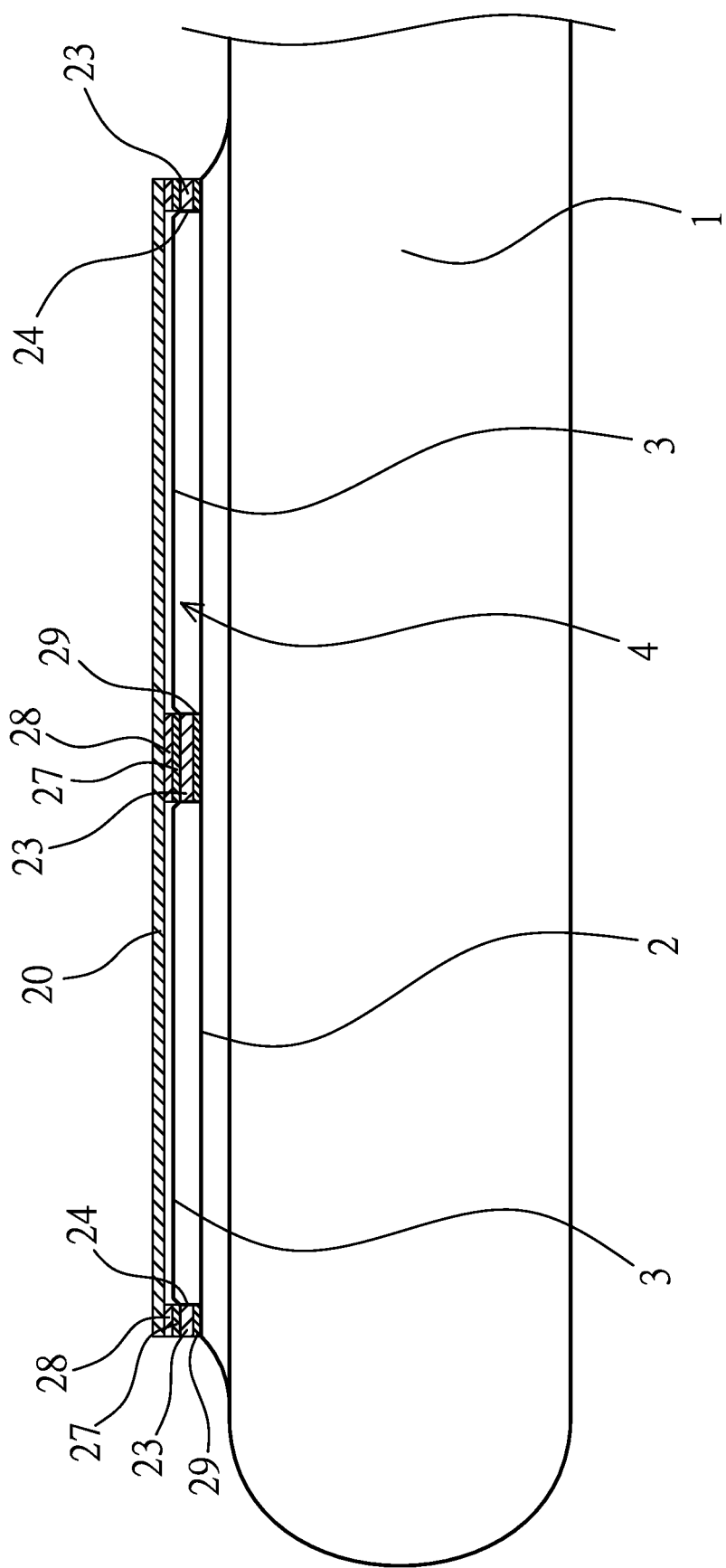
FIG. 3 is a cross-sectional view of the present invention attached to the mobile phone.

Referring to FIG. 2 and FIG. 3, a multi-lens protection device of a mobile phone comprises a protector 20, a multi-lens positioning plate 23, a first adhesive layer 27, an opaque printing layer 28, and a second adhesive layer 29.

The protector 20 is a flat sheet corresponding in contour and in shape to an upper surface of a camera module convex body 2 on a mobile phone 1. The protector 20 has a first through hole 21 corresponding to a flash 5 on the camera module convex body 2 and a second through hole 22 corresponding to a sensor 6 on the camera module convex body 2. A shielding coating 211 is coated on the periphery of the first through hole 21.

The multi-lens positioning plate 23 corresponds in contour and in shape to the protector 20. The multi-lens positioning plate 23 has at least two perforations 24 corresponding in position and in shape to camera lenses 3 on the camera module convex body 2. The multi-lens positioning plate 23 further has a first plate through hole 25 corresponding to the first through hole 21 and a second plate through hole 26 corresponding to the second through hole 22.

The first adhesive layer 27 corresponds in shape to the multi-lens positioning plate 23, and is attached to one side of the multi-lens positioning plate 23, facing the protector 20.

The opaque printing layer 28 corresponds in shape to the first adhesive layer 27, and is attached to one side of the protector 20, facing the first adhesive layer 27. The opaque printing layer 28 is adhered to the first adhesive layer 27.

The second adhesive layer 29 corresponds in shape to the multi-lens positioning plate 23, and is attached to another side of the multi-lens positioning plate 23, facing away from the first adhesive layer 27. The second adhesive layer 29 is adhered to the surface of the camera module convex body 2. The total thickness of the second adhesive layer 29, the multi-lens positioning plate 23, the first adhesive layer 27 and the opaque printing layer 28 is greater than or equal to the height of the camera lenses 3 protruding from the camera module convex body 2.

With the above device, the perforations 24 of the multi-lens positioning plate 23 can be quickly aligned with the respective camera lenses 3, and the protector 20 can be quickly and accurately adhered to the camera module convex body 2 without generating air bubbles, thereby protecting the camera module convex body 2 from scrapes or direct impacts.

The assembly, the function and the details of the aforesaid embodiment are described as follows. As shown in FIG. 2 and FIG. 3, the present invention is a protection device for multiple camera lenses 3 of a single model of mobile phone 1. If the specification of the camera module convex body 2 is different, the arrangement, size and number of the camera lenses 3 will be different, and the shape of the perforations 24 of the multi-lens positioning plate 23 will also be adjusted. The multi-lens positioning plate 23 may be made of an opaque hard plastic material (for example, polycarbonate sheet) or an aluminum alloy material, but not limited thereto. In use, the multi-lens positioning plate 23 has the ability to locate and protect the camera module convex body 2. The protector 20 may be a transparent sheet made of scrape-resistant, wear-resistant tempered glass or plastic material, but not limited thereto. The first adhesive layer 27 may be an OCA optical adhesive having a relatively high-viscosity, and the second adhesive layer 29 may be a double-sided adhesive having a relatively low-viscosity, but not limited thereto.

When the present invention is to be adhered to the camera lens group 4, the mobile phone 1 is first placed horizontally with the camera module convex body 2 facing up. The user aligns the transparent protector 20 with the camera lens group 4. Because the total thickness of the second adhesive layer 29, the multi-lens positioning plate 23, the first adhesive layer 27 and the opaque printing layer 28 is greater than or equal to the height of the camera lenses 3 protruding from the camera module convex body 2, the perforations 24 are fitted with the respective camera lenses 3 and will not abut against the underside of the protector 20, without hindering the second adhesive layer 29 from adhering to the camera module convex body 2 in the area other than the camera lenses 3, so that the user can quickly align the multi-lens positioning plate 23 with the camera module convex body 2 correctly. Then, the user gently presses the protector 20 with his/her fingers to make it firmly adhere to the camera module convex body 2 to complete the attachment operation. With the above device, the protector 20 can be quickly and accurately adhered to the camera module convex body 2 without generating air bubbles, thereby protecting the surface of the camera module convex body 2 from scrapes or direct impacts. In order to effectively reduce the light of the flash 5 of the mobile phone 1 to pass through the protector 20 to generate a refraction or light guide to affect the camera lenses 3, leading to a white haze or bluish tone in the photo, the shielding coating 211 is coated on the periphery of the first through hole 21, and the opaque printing layer 28 and the multi-lens positioning plate 23 under the protector 20 are made of opaque materials, thereby reducing the light of the flash 5 from the underside or edge of the protector 20 to pass through the protector 20 to generate a refraction and light guide. In this way, the normal photographing quality of the camera lenses 3 can be ensured. Preferably, the shielding coating 211 and the opaque printing layer 28 are black ink coatings, but not limited thereto.

Figure 4:
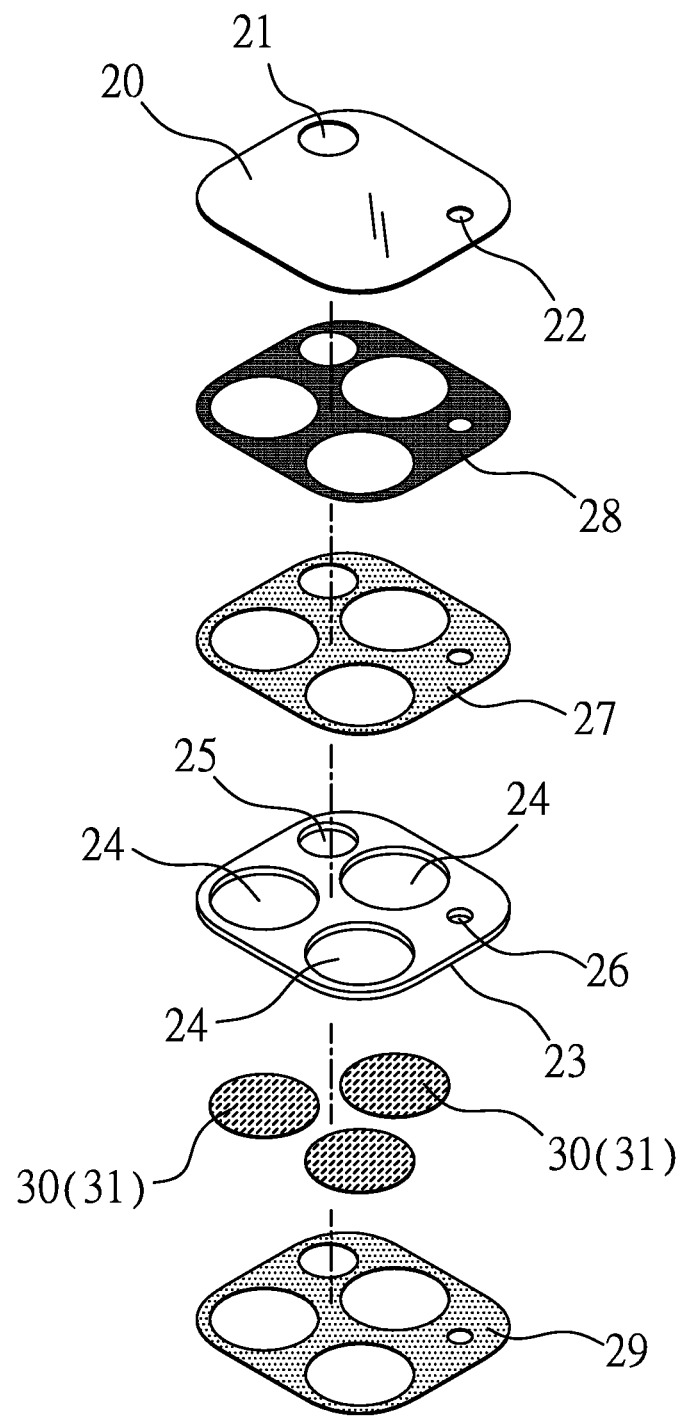
FIG. 4 is an exploded view of the present invention provided with the explosion-proof layer.
Figure 5:
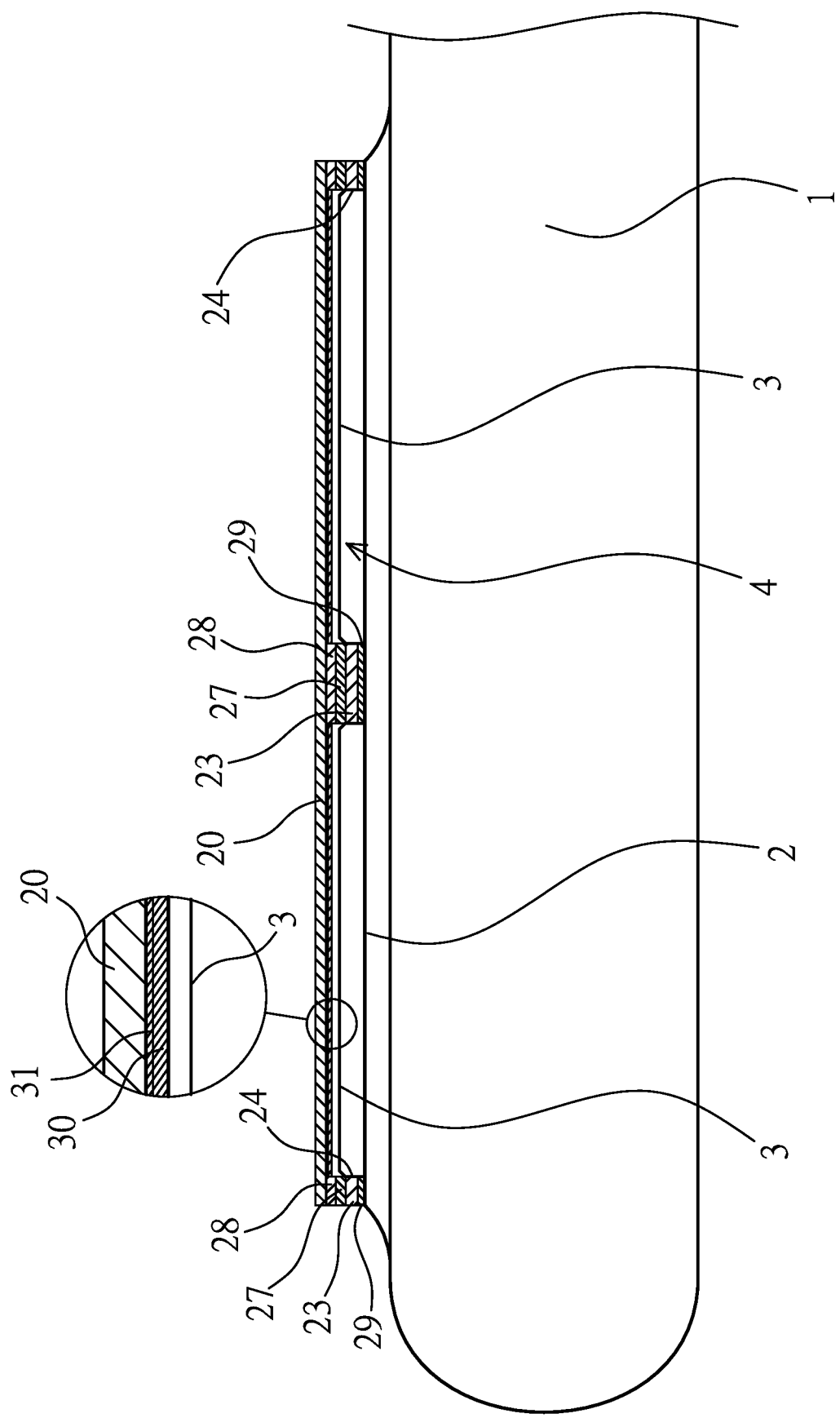
FIG. 5 is a cross-sectional view of the present invention provided with the explosion-proof layer.

Furthermore, as shown in FIG. 4 to FIG. 5, an explosion-proof layer 30 is provided on the underside of the protector 20 located in each of the perforations 24. A third adhesive layer 31 is disposed on top of the explosion-proof layer 30 to be adhered to the underside of the protector 20. The total thickness of the second adhesive layer 29, the multi-lens positioning plate 23, the first adhesive layer 27 and the opaque printing layer 28 minus the total thickness of the explosion-proof layer 30 and the third adhesive layer 31 is greater than or equal to the height of the camera lenses 3 protruding from the camera module convex body 2. The protector 20 made of tempered glass, corresponding in position to the camera lenses 3, increases the strength of the camera lenses 3 so as to protect the camera lenses 3 better. Even if it is broken by impact, the pieces of the tempered glass will not scatter.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A multi-lens protection device for a mobile phone, comprising a protector, a multi-lens positioning plate, a first adhesive layer, an opaque printing layer, and a second adhesive layer, wherein the protector is configured for corresponding in contour and in shape to an upper surface of a camera module convex body on the mobile phone, wherein the multi-lens positioning plate, which has a contour and shape corresponding to the protector, having at least two perforations positioned and shaped corresponding to camera lenses on the camera module convex body, wherein the first adhesive layer is shaped corresponding to the multi-lens positioning plate and attached to one side of the multi-lens positioning plate, while facing the protector, wherein the opaque printing layer is shaped corresponding to the first adhesive layer and attached to one side of the protector while facing the first adhesive layer, wherein the opaque printing layer is adhered to the first adhesive layer, wherein the second adhesive layer is shaped corresponding to the multi-lens positioning plate and attached to another side of the multi-lens positioning plate while facing away from the first adhesive layer, wherein a total thickness of the second adhesive layer, the multi-lens positioning plate, the first adhesive layer, and the opaque printing layer has a height at least equal to a height of the camera lenses protruding from the camera module convex body.

2. The multi-lens protection device as claimed in claim 1, wherein the protector has a first through hole corresponding to a flash on the camera module convex body, and the multi-lens positioning plate has a first plate through hole corresponding to the first through hole.

3. The multi-lens protection device as claimed in claim 2, wherein a shielding coating is coated on a periphery of the first through hole.

4. The multi-lens protection device as claimed in claim 3, wherein the shielding coating is a black ink coating.

5. The multi-lens protection device as claimed in claim 2, wherein the protector has a second through hole corresponding to a sensor on the camera module convex body, and the multi-lens positioning plate has a second plate through hole corresponding to the second through hole.

6. The multi-lens protection device as claimed in claim 1, wherein the multi-lens positioning plate is made of an opaque hard plastic material or an aluminum alloy material.

7. The multi-lens protection device as claimed in claim 1, wherein an explosion-proof layer is provided on an underside of the protector located in each of the perforations, a third adhesive layer is disposed on top of the explosion-proof layer to be adhered to the underside of the protector, and the total thickness of the second adhesive layer, the multi-lens positioning plate, the first adhesive layer and the opaque printing layer minus a total thickness of the explosion-proof layer and the third adhesive layer is greater than or equal to the height of the camera lenses 3 protruding from the camera module convex body.

8. The multi-lens protection device as claimed in claim 1, wherein the opaque printing layer is a black ink coating.

\* \* \* \* \*